Figure 1:
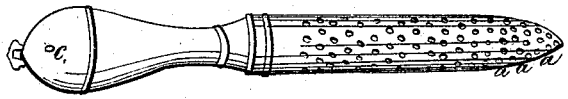
Figures 2, 4:
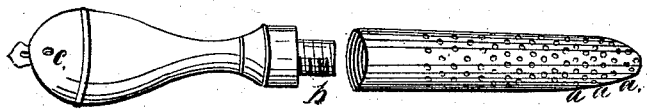
Figure 3:

E. Bourguard,
Device for Assisting Dentition.
Nº 58,186.       Patented Sep. 18, 1866.

Witnesses:

Elie Bonin

Horace Andrews,

Inventor:

E. Bourguard

UNITED STATES PATENT OFFICE.

EUGENE BOURQUARD, OF PARIS, FRANCE, ASSIGNOR TO HIMSELF AND PIERRE BOISSET, OF SAME PLACE.

IMPROVEMENT IN INSTRUMENTS FOR CUTTING TEETH.

Specification forming part of Letters Patent No. 58,186, dated September 18, 1866.

*To all whom it may concern:*

Be it known that I, EUGENE BOURQUARD, of the city of Paris, in the Empire of France, have made a new and useful Invention for Assisting Infants in Cutting Their Teeth; and I do hereby declare that the following is a full and exact description of the same, reference being had to the accompanying drawings and to the letters of reference marked thereon.

Figure I represents the entire article when ready for use, the same to be of convenient size for infant's use. Fig. II represents a perforated tube disconnected from the handle. Fig. III represents the sponge or other porous substance which is to be inserted in the perforated tube. Fig. IV represents the handle of the article.

The tube may be made of wood, metal, india-rubber, or other hard material, and of conical or other shape, perforated with small holes $a\,a\,a$, and the surface smooth, rough, grooved, or corrugated.

The open end of the tube may be stopped or closed with a plug or handle, or in any manner most convenient.

The handle may be made of the same materials as the tube, and attached to the tube by a screw, $b$, or any other suitable mode, and the form thereof may be varied according to fancy.

The handle may be provided with a hole, $c$, for the purpose of hanging it to the child's neck by a ribbon; the sponge or other porous substance to be made of size and shape corresponding to the tube which it is intended to fill, and is to be saturated with sugar or any other mixture of pleasant taste to the child.

The sweet substance contained in the tube will pass through the little holes into the child's mouth on being sucked by him, and will induce him to retain it in his mouth, while the hard surface of the tube will aid in cutting the gums.

What I claim as my invention, and desire to secure by Letters Patent, is—

A perforated tube, in connection with a handle or any other contrivance for closing the open end of the tube, together with a sponge or other porous substance, to be used as above described. The sponge may be dispensed with and the perforated tube filled with sugar or any other sweet substance of such consistency as will not require a sponge to hold it.

New York, February 21, 1866.

E. BOURQUARD.

Witnesses:
 ELIE BOMIE,
 CHAS. S. ANDREWS.